2,980,740
α,α,ω-TRIHYDROPERFLUOROALKANES

William R. Hasek and Alfred C. Haven, Jr., Wilmington, Del., assignors to E. I. du Pont de Nemours and Company, Wilmington, Del., a corporation of Delaware No Drawing. Filed June 19, 1958, Ser. No. 743,012

8 Claims. (Cl. 260—653.8)

This invention relates to fluorinated compounds and to a process for preparing them. More particularly, it relates to polyfluorinated alkanes and their synthesis.

Fluorinated alkanes which contain a high percentage of fluorine have recently achieved considerable technical importance because they possess an unusual combination of properties. Polyfluorinated hydrocarbons generally have excellent thermal stability and high resistance to decomposition by oxidation. The gaseous or readily volatile compounds are used as propellants for aerosols while the high boiling liquid and solid products are useful as thermally stable lubricants and greases for high temperature applications. Simple and economical methods which can be used to obtain fluorinated alkanes are, therefore, important.

Polyfluorinated alkanes have been prepared heretofore by processes which employ elemental fluorine or which require as reactants compounds that are not readily accessible. The processes require careful control and often give mixtures of fluorinated alkanes which are difficult to separate.

An object of this invention is, consequently, provision of a novel process for preparing polyfluorinated alkanes which avoids the use of elemental fluorine.

Another object is provision of certain novel polyfluoroalkanes.

In the furtherance of the above-mentioned and yet other objects, these is now provided a process which comprises reacting sulfur tetrafluoride with a polyfluorinated alcohol containing, in addition to the hydroxyl group, only carbon, fluorine and three hydrogens, two of which hydrogens are bonded to the alpha carbon of the polyfluorinated alcohol, the remaining hydrogen being on the omega carbon. The polyfluorinated alcohols which are employed as reactants in the process have the formula $H(CF_2)_nCH_2OH$, wherein $n$ is a positive integer. An especially preferred class of these alcohols is prepared by telomerization of tetrafluoroethylene with methanol, as described in U.S. Patent 2,559,628. They are also described as α,α,ω-trihydroperfluoroa'kanols.

Polyfluorinated alcohols of any chain length are operable in the process; the value of $n$ in the above formulas is therefore not naturally limited. The value of $n$ can be 1 or can be as high as 24, or higher. However, because of availability and ease of handling, polyfluorinated alcohols are preferred in which the value of $n$ in the formulas for the alcohols is not more than 18. In an especially preferred group of alcohols, the value of $n$ in the above formula lies between 2 and 12.

The alcohols which are employed as reactants in the process need not be pure compounds. Mixtures of alcohols of various chain lengths can be employed, for example, the mixture of telomer alcohols obtained as described in U.S. Patent 2,559,628 can be employed without preliminary separation by fractional distillation. Commercial grade products can be employed and need not be especially purified before use. It is desirable that the fluorinated alcohols be substantially free of moisture since sulfur tetrafluoride reacts with water.

The sulfur tetrafluoride used in the process can be prepared by methods described in the literature (Brown and Robinson, J. Chem. Soc. 1955, 3147–51).

In the process of the reaction, the hydroxyl group of the polyfluorinated alcohol is replaced by a fluorine atom with substantially no change in the polyfluoroalkyl group to which the hydroxyl radical is initially bonded. For this reason the number of carbon atoms in the polyfluoroalkyl group is not critical or important in the operation of the process; the polyfluoroalkyl group does not enter into the reaction. There are practically no side reactions, such as formation of olefins or ethers, which occur frequently in processes which employ fluorine-free alcohols. The principal by-products obtained in the reaction are thionyl fluoride and hydrogen fluoride. Suitable precautions should be taken in handling these materials.

The reaction of the polyfluorinated alcohol and sulfur tetrafluoride is conducted under substantially anhydrous conditions in either a batch or continuous flow process. In either process the reaction chamber is preferably made of material resistant to attack by hydrogen fluoride, e.g., stainless steel.

In a batch process a vessel capable of withstanding pressure is preferably flushed with an inert gas, for example, nitrogen, to displace the air and charged with the alcohol. The vessel is preferably cooled to a low temperature, for example, by immersion in a solid carbon dioxide-acetone mixture. The reaction vessel is then evacuated to a low pressure, about 10 mm. or less, and charged with sulfur tetrafluoride. The vessel is closed and the mixture heated at the desired temperature with suitable mechanical agitation.

It is not essential for operability that the reactants be used in any particular ratios. However, in order to obtain maximum yield of the polyfluorinated alkane certain ratios of reactants are preferred. Generally the molar ratio of polyfluorinated alcohol to sulfur tetrafluoride lies between about 3:1 and 1:10. Best yields are obtained if the value for the molar ratio of alcohol to sulfur tetrafluoride lies between about 2:1 and 1:6. An excess of sulfur tetrafluoride is preferably employed in the process to assure complete conversion of the alcohol to a polyfluoroalkane.

The temperature of the reaction is kept as low as operability permits. It will generally lie between about 20° and about 300° C. although lower or higher temperatures can be employed. The preferred temperature range lies between about 30° and 150° C. In general, low molecular weight alcohols, that is, alcohols with short carbon chains, react at lower temperatures than long chain alcohols. In fact, reaction with low molecular weight alcohols may occur at a temperature as low as −20° C. The long chain alcohols are liquids or low-melting solids which may require heating to assure maximum reaction with the sulfur tetrafluoride. Excessively high temperatures are not necessary, however, and provide little or no advantage in economy of operation or yield of desired product.

Heating of the reactants can be accomplished by a stepwise procedure wherein the reactants are maintained for short periods of time at progressively higher temperatures. This procedure permits smooth operation of the process and avoids sudden increases in pressure in the reaction vessel. However, this procedure is not essential for operability. The reactants can, if desired, be heated in one step to the reaction temperature. The time of heating is generally between about 2 hours and about 48 hours.

The pressure employed in a batch process is generally autogenous. It can be between about 5 atmospheres and 150 atmospheres although lower or higher pressures can be employed without affecting operability. Pressure is not a critical factor in the process of the invention.

The process of the invention can also be conducted by a continuous flow method, wherein, for example, the polyfluorinated alcohol is placed in a corrosion-resistant vessel and sulfur tetrafluoride gas bubbled through it at a predetermined temperature. Alternatively, vapors of low-boiling polyfluorinated alcohols and sulfur tetrafluoride gas can be passed continuously through a heated tube. The volatile reaction products can be collected in traps cooled with suitable refrigerants. A continuous process is usually operated at atmospheric pressure although it can be conducted at pressures that are higher or lower than atmospheric.

The products of the reaction, that is, the $\alpha,\alpha,\omega$-trihydroperfluoroalkanes, are purified by conventional procedures. If volatile, they can be passed through scrubbing towers containing aqueous caustic solutions and then through towers which contain drying agents. Liquid and solid products can be washed with aqueous alkaline solutions and then dried. The products can, if desired, be purified further by fractional distillation.

The following examples, in which quantities are expressed as parts by weight, illustrate the process of this invention. In each of the examples, a vessel is used which is lined with "Hastelloy" C and is capable of withstanding pressure. "Hastelloy" C is a well-known chemically resistant alloy of nickel, iron and molybdenum.

Example I

A pressure vessel (capacity 145 parts of water), lined with a corrosion-resistant material, is flushed with nitrogen and charged with 26.4 parts of 2,2,3,3-tetrafluoro-1-propanol. The charged vessel is cooled in a solid carbon dioxide-acetone mixture and evacuated to about 2–10 mm. pressure. It is then charged with 33 parts of sulfur tetrafluoride. The molar ratio of tetrafluoropropanol to sulfur tetrafluoride is approximately 1:1.5. The vessel is closed and heated at 45° C. for 2 hours and 80° C. for 4 hours. After cooling to room temperature, the volatile products (54 parts) are vented into a stainless steel cylinder which is cooled in liquid nitrogen. The volatile products obtained from two runs are combined and passed through a purification train consisting of three polyethylene bottles, each containing 40% aqueous potassium hydroxide solution, and through a tower packed with anhydrous calcium sulfate. There is obtained 34.5 parts of 1H,1H,3H-pentafluoropropane which is collected in a trap cooled in solid carbon dioxide-acetone mixture. The identity of the product is confirmed by mass spectrometric analysis. The compound, 1H,1H,3H-pentafluoropropane, boils at 26° C.

Example II

A pressure vessel is charged, as described in Example I, with 125 parts of 1H,1H,7H-dodecafluoro-1-heptanol and 82 parts of sulfur tetrafluoride. The molar ratio of the polyfluorinated heptanol to sulfur terrafluoride is about 1:2. The charged vessel is heated with agitation at 60° C. for 2 hours and 80° C. for 8 hours. There is obtained 128.4 parts of crude liquid product. The crude liquid products of two runs are combined and poured, with stirring, into 250 parts of pentane which contains 34 parts of finely pulverized sodium fluoride. The mixture is filtered and the filtrate is distilled through an efficient fractionating column. There is obtained 140 parts of 1H,1H,7H-tridecafluoroheptane, a colorless liquid boiling at 122–123° C. The structure is confirmed by the nuclear magnetic resonance spectrum and by elementary analysis.

*Analysis.*—Calc'd for $C_7H_3F_{13}$: C, 25.2; H, 0.9; F, 73.9. Found: C, 25.8; H, 1.2; F, 73.7.

Example III

Using the procedure described in Example I, a mixture of 77 parts of 1H,1H,9H-hexadecafluoro-1-nonanol and 39 parts of sulfur tetrafluoride is heated at 60° C. for 2 hours and 80° C. for 6 hours. The molar ratio of fluorinated nonanol to sulfur tetrafluoride is about 1:2. There is obtained 78.1 parts of liquid product which is poured with agitation into 62 parts of pentane containing 8 parts of finely divided sodium fluoride. The mixture is filtered and the filtrate distilled through an efficient fractionating column to give 51.3 parts of 1H,1H,9H-heptadecafluorononane, a colorless liquid which boils at 76–78° C. at 30 mm.

*Analysis.*—Calc'd for $C_9H_3F_{17}$: C, 24.9; H, 0.7; F, 74.4. Found: C, 25.3; H, 1.1; F, 74.2.

Examples I through III illustrate the application of the process to an $\alpha,\alpha,\omega$-trihydroperfluoroalkanol, that is, an alcohol of the formula $H(CF_2)_nCH_2OH$. As previously stated, these alcohols can be obtained by telomerization of tetrafluoroethylene and methanol and form a preferred group of reactants. Examples of such polyfluorinated alcohols, shown by formula, are $H(CF_2)_{10}CH_2OH$, $H(CF_2)_{12}CH_2OH$, $H(CF_2)_{18}CH_2OH$, and $$H(CF_2)_{24}CH_2OH$$

The fluorinated alkanes which are obtained are, respectively, $H(CF_2)_{10}CH_2F$, $H(CF_2)_{12}CH_2F$, $H(CF_2)_{18}CH_2F$, and $H(CF_2)_{24}CH_2F$.

Example IV

Using the procedure described in Example I, a mixture of 20 parts of 1H,1H-pentadecafluoro-1-octanol $[CF_3(CF_2)_6CH_2OH]$ and 22 parts of sulfur tetrafluoride is heated at 60° C. for 2 hours and 80° C. for 6 hours. The molar ratio of fluorinated octanol to sulfur tetrafluoride is about 1:4. There is obtained 21 parts of liquid product which is fractionally distilled to yield 10.8 parts of 1H,1H-hexadecafluorooctane, boiling at 123–124° C.

Example IV illustrates the application of the process to a 1,1-dihydroperfluoroalkanol, that is, a compound of the formula $F(CF_2)_nCH_2OR$ or, alternatively, $C_nF_{2n+1}CH_2OH$. Examples of alcohols of this type, illustrated by formula, are $CF_3CH_2OH$, $CF_3(CF_2)_2CH_2OH$, $CF_3(CF_2)_4CH_2OH$, $CF_3(CF_2)_7CH_2OH$, and $CF_3(CF_2)_9CH_2OH$ The fluorinated alkanes which are obtained are, respectively, $CF_3CH_2F$, $CF_3(CF_2)_2CH_2F$, $CF_3(CF_2)_4CH_2F$, $CF_3(CF_2)_7CH_2F$, and $CF_3(CF_2)_9CH_2F$.

The process of the invention is particularly valuable for synthesizing a new class of polyfluoroalkanes. These new compounds contain at least three carbons and are composed solely of carbon, fluorine and three hydrogens, which hydrogens are bonded to the terminal carbons of the polyfluoroalkane, each terminal carbon bearing at least one hydrogen. The new polyfluoroalkanes are represented by the formula $H(CF_2)_nCH_2F$, where $n$ is a positive integer with a value of at least 2. The simplest member of this group of new compounds is 1H,1H,3H-pentafluoropropane, that is, $HCF_2CF_2CH_2F$ whose preparation is described in Example I. Examples of other compounds of this group are as follows (represented by formulas):

$H(CF_2)_4CH_2F$, $H(CF_2)_6CH_2F$, $H(CF_2)_{14}CH_2F$, $H(CF_2)_{16}CH_2F$, and $H(CF_2)_{18}CH_2F$ All of these novel compounds are liquid or solid at normal room temperatures, i.e. about 20° C.

These new compounds are characterized by having a terminal —$CHF_2$ group and a terminal —$CH_2F$ group which are joined by a —$(CF_2)_n$— group in which $n$ has a value of at least 1. This combination of groups or this structure is new and provides compounds with unexpectedly high boiling points, low rates of evaporation and unusual behavior on solid surfaces. To illustrate, the product of Example II, 1H,1H,7H-tridecafluoroheptane, which has only 7 carbons, has substantially the same boiling point as 1H,1H-hexadecafluorooctane, an 8-carbon compound which is representative of a known class of α,α-dihydroperfluoroalkanes whose preparation is described in Example IV.

The trihydroperfluoroalkanes of the invention have unexpectedly low evaporation rates as shown by the following behavior of 1H,1H,7H-tridecafluoroheptane and 1H,1H-hexadecafluorooctane:

Drops of equal volume of each compound were placed on surfaces of glass, aluminum and autobody steel. These were allowed to stand at room temperature (about 25° C.) and the times were noted for each drop to evaporate completely. The α,α,ω-trihydroperfluoroheptane consistently took about twice as long a time to evaporate as the α,α-dihydroperfluorooctane.

The α,α,ω-trihydroperfluoroalkanes of this invention show unusual capillary and wicking action. To illustrate, small quantities of α,α,ω-trihydroperfluoroheptane and α,α-dihydroperfluorooctane are placed in separate vessels in which glass capillary tubes of about ⅓ mm. bore are suspended to a depth sufficient to cover the open end of each tube. In every case, the α,α,ω-trihydroperfluoroheptane rises about 30% higher in the capillary tube than the α,α-hydroperfluorooctane. When strips of filter paper are used instead of the glass capillary tubes, a similar result is observed, that is, the α,α,ω-trihydroperfluoroheptane wets the paper to a greater height than the α,α-dihydroperfluorooctane.

The new compounds of the invention show good hydrolytic stability in contact with water under neutral or mildly acidic conditions. To illustrate, 1H,1H,7H-tridecafluoroheptane in contact with water containing methyl orange indicator at 25° C. does not show any formation of acid over a period of 160 hours. As a further illustration, 1H,1H,9H-heptadecafluorononane in contact with a dilute solution of acetic acid containing a fluoride ion indicator (a zirconium alizarin lake) does not give a positive test for fluoride ion when warmed to 95° C. for 1 hour.

The new products of the invention, i.e., the α,α,ω-trihydroperfluoroalkanes, are useful in many fields. The more volatile products can be used economically as propellants in aerosols. The higher boiling liquid and solid products have excellent thermal stability and are useful in the field of lubricating oils and greases. They evaporate less readily and, because of superior capillary and wicking action, lubricate more effectively than presently available compounds.

The α,α,ω-trihydroperfluoroalkanes, in particular 1H,1H,3H-pentafluoropropane, are useful as solvent media for the polymerization of perfluoroolefins, for example, tetrafluoroethylene.

Since obvious modifications in the invention will be evident to those skilled in the chemical arts, we propose to be bound solely by the appended claims.

The embodiments of the invention in which an exclusive property or privilege is claimed are defined as follows:

1. The process which comprises reacting an alcohol of the formula $H(CF_2)_nCH_2OH$, wherein $n$ is a positive integer with a value of between 1 and 24, with a sulfur tetrafluoride and thereby preparing a polyfluoroalkane.
2. The process of claim 1 wherein the molar ratio of alcohol to sulfur tetrafluoride is between about 3:1 and 1:10.
3. The process which comprises reacting 1H,1H,7H-dodecafluoro-1-heptanol with sulfur tetrafluoride and thereby preparing a polyfluoroalkane.
4. The process which comprises reacting 1H,1H,9H-hexadecafluoro-1-nonanol with sulfur tetrafluoride and thereby preparing a polyfluoroalkane.
5. A polyfluoroalkane consisting solely of between 3 and 25 carbons, fluorine, and three hydrogens, said hydrogens being bonded to the terminal carbons of the polyfluoroalkane, each terminal carbon bearing at least one hydrogen.
6. 1H,1H,3H-pentafluoropropane.
7. 1H,1H,7H-tridecafluoroheptane.
8. 1H,1H,9H-heptadecafluorononane.

References Cited in the file of this patent

UNITED STATES PATENTS

| | | |
|---|---|---|
| 2,551,573 | Downing et al. | May 8, 1951 |
| 2,709,186 | Farlow et al. | May 24, 1955 |
| 2,827,471 | Gaulin et al. | Mar. 18, 1958 |
| 2,859,245 | Smith | Nov. 4, 1958 |

OTHER REFERENCES

Simons: Fluorine Chemistry, Volume I, 1950, page 539, Academic Press, Inc., New York.

Simons: Fluorine Chemistry, Volume II, 1954, page 275, Academic Press, Inc., New York.

Slesser et al.: Preparation Properties, and Technology of Fluorine and Organic Fluoro Compounds, 1951, page 835, McGraw-Hill Book Co., Inc.